Sept. 17, 1968  E. C. SCHROM  3,401,473
APPARATUS FOR MARINE EXCAVATION
Filed April 29, 1966
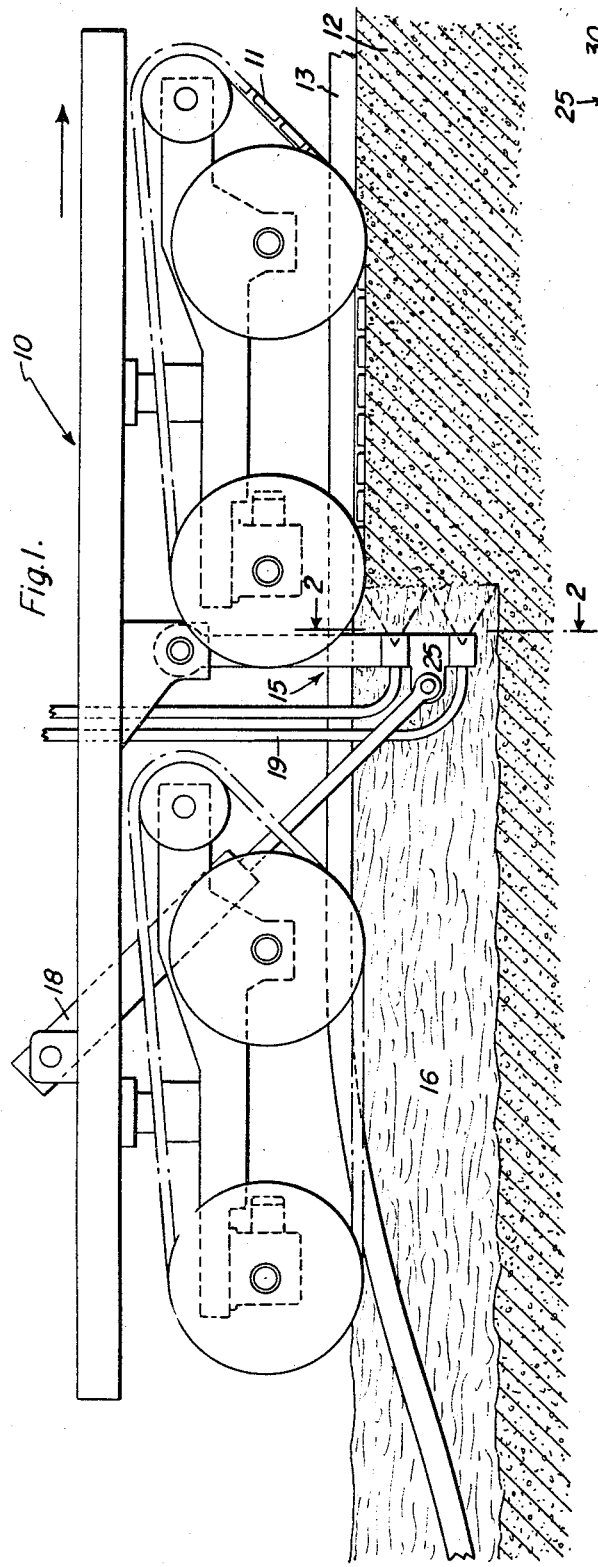
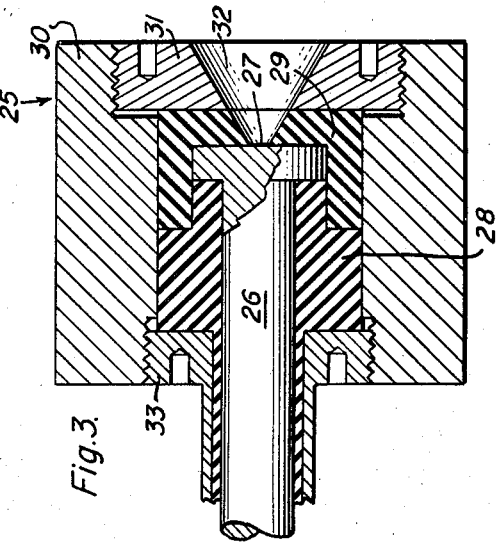
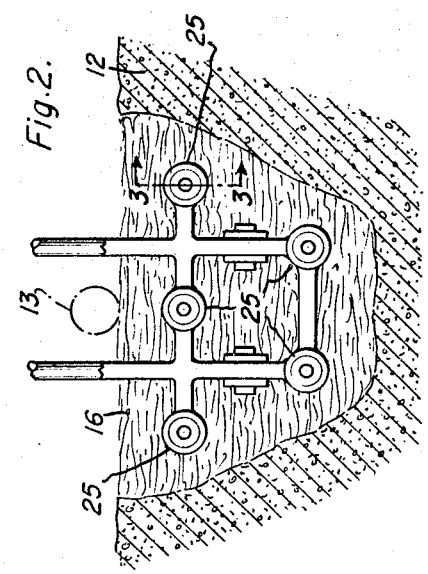
Inventor:
Edward C. Schrom,
by Richard A. Speer
His Attorney.

United States Patent Office 3,401,473
Patented Sept. 17, 1968

3,401,473
APPARATUS FOR MARINE EXCAVATION
Edward C. Schrom, Schenectady, N.Y., assignor to General Electric Company, a corporation of New York
Filed Apr. 29, 1966, Ser. No. 546,431
1 Claim. (Cl. 37—54)

ABSTRACT OF THE DISCLOSURE

An apparatus is disclosed for burying pipe or cable in marine floors or ocean bottoms. The apparatus comprises a carrier structure which is movable along the surface of the marine floor and carries a plurality of electrohydraulic discharge heads each comprising a pair of electrodes defining discharge gaps positioned under the elongated body to be buried. Successive electrical discharges across the discharge gaps cause the marine floor under the elongated body to become fluidized to a point where it cannot support the elongated body which then sinks into the floor where it subsequently becomes buried therein.

---

This invention relates to the trenching of marine floors such as ocean bottom and the like, to bury such objects as pipe, cable, etc., and particularly to a method and an apparatus for directing electric arc-created shock waves against the marine floor. The shock waves strike the floor in the areas selected for trenching and cause it to become fluidized to the point that it is no longer capable of supporting the object to be buried.

Due to the amount of liquid or fluidized materials transported through pipes, for example gas, oil, and various types of industrial chemicals and, in view of the large number of electric cables and other types of communication lines, it has become important that adequate means be found for protecting these pipes, cables, etc. from damage when crossing the floors of marine bodies. For example, the large number of off-shore drilling rigs now operating in the ocean utilize pipelines laid on the ocean floor to conduct the crude oil to a shore site for subsequent processing. Frequently, storms result in these pipes being broken and moved appreciable distances over the ocean floor. While it has been possible when transversing comparatively small marine bodies such as rivers and small lakes to suitably bury pipes and cables by utilizing dredge lines, hydraulic dredges and related types of equipment, the operation has still been difficult and generally has not been feasible when operating in the ocean.

Summary of the invention

This invention relates to apparatus for burying elongated objects such as pipelines or cables in the surface of the bottom of a body of water such as the floor of a lake or ocean. The apparatus consists of a supporting vehicle which is movable along a submerged pipe or cable and carries a plurality of electrohydraulic discharge heads which are positioned under the pipe or cable and repetitively discharged to cause the floor under the pipe or cable to become fluidized and the pipe or cable sinks into the fluidized material under its own weight.

It is a principal object of this invention to provide a process for trenching the floors of marine bodies to effect burial of pipes, cables, etc.

It is another object of this invention to provide a process for trenching marine floors whereby bodies can be buried in the floor without hauling in additional material to effect covering of the buried object.

Other objects and advantages of this invention will be in part obvious and in part explained by reference to the accompanying specification and drawings.

In the drawings:
FIG. 1 is a side elevation of a device, shown positioned on a marine floor, with which the process of the present invention can be carried out;
FIG. 2 is a view taken along the line 2—2 of FIG. 1 showing that part of the apparatus which effects the trenching operation; and
FIG. 3 is a cross-sectional view, partly full, through one of the electrodes utilized to carry out the trenching operation.

The present process utilizes an electrode having inner and outer electrode portions to effect the trenching of a marine bottom, this being accomplished by means of an arc that is discharged between the inner and outer electrode portions to create a shock wave that travels away from the arc in the surrounding water. When this shock wave is appropriately directed at a portion of the marine floor, it causes the solid material to become fluidized and be incapable of supporting any appreciable weight. When this occurs, any object to be buried will sink to the bottom of the fluidized material so that when the solids settle back to their original position, the object is effectively buried.

Referring to FIG. 1 of the drawings, the numeral 10 indicates generally a carrier vehicle which has suitable continuous belts 11 with which it can travel over the floor 12 of the marine body. The vehicle 10 would normally be moved by connecting it, by means of cables or the like, to a barge or ship or other suitable vessel located on the surface of the marine body. It should be pointed out that neither the particular vehicle shown nor the means of locomotion are essential to the present invention, since many other and diverse types of support carriers could as adequately be used. The carrier vehicle straddles a pipe 13 which is already located on the marine floor so that as the trenching apparatus 15 moves along with the vehicle 10, a portion of the marine bed becomes fluidized, as indicated at 16, and the pipe 13 settles to the bottom of the trench in the manner indicated. It is not necessary that the pipe be previously located on the marine floor but this is the preferred method since it simplifies the overall operation of burying continuous long lengths of pipe or cable, etc.

The trenching apparatus 15 is pivotally supported to the bed of vehicle 10 by upwardly extending arms 17 and is braced mechanically, as by means of cylinder-piston 18, which can be used to move the trenching apparatus into and out of operating position. Other means for moving the trenching apparatus into and out of operating position can as readily be used. Numeral 19 indicates electrical cables which supply electrical power to the electrodes 25 that effect the actual trenching operation.

Turning to FIG. 3 of the drawings, this view shows one of the electrodes that fluidize the solid materials of the marine bottom and thereby create a trench within which objects are to be buried. In this electrode 25, the inner electrode 26 which has an arcing surface 27 on one end, is connected vis-a-vis cables 19 to a source of high potential such as a capacitor bank (not shown). Inner electrode 26 is surrounded by insulator means 28 and a separate electric insulator 29 which extends around and covers a portion of the arcing surface 27.

An outer electrode 30 is disposed coaxially with respect to inner electrode 26 and contains a removable insert 31 which has an arcing surface 32. The exposed portion of inner electrode arcing surface 27 and the arcing surface 32 of insert 31 are separated from each other by that portion of electric insulator 29 that covers most of surface 27. A retaining ring 33 surrounds inner electrode 26 and secures the outer electrode 30 to the inner electrode to make the complete electrode assembly.

In operation, when a strong electric pulse is supplied to inner electrode 26, an electric arc is discharged between the exposed portion of surface 27 and the arcing surface 32, the outer electrode of course being the ground through which the electricity is discharged. Obviously the required arcing between surfaces 27 and 32 can also be effected by connecting the outer electrode 30 to a source of high voltage power and rendering the inner electrode 26 an electrical ground. The discharge arc creates a pressure gradient or shock wave which is transmitted through the surrounding liquid medium. It is apparent that the insulator 29 and the removable insert 31 of outer electrode 30 define complementing annuli that together form a frustum of a cone. Thus, when an arc is discharged between the arcing surfaces 27 and 32, the generated shock wave is directed outwardly away from the electrode 25 and can be directed against any desirable surface. Many configurations other than conical, such as an elliptical section, can be utilized depending upon the type of shock wave to be propagated.

The outer electrode 30 has been provided with removable insert 31 so that it can be rapidly replaced or substituted with another insert having an opening of different size or configuration. Similarly, the insulator 29 would be replaced with one having an opening complementing that of insert 31 when the insert is changed. Additionally, it should be noted that the manner in which insulator 29 is constructed and fitted into the electrode that the insert 31 places the insulaor 29 under compression and thereby ensures ruggedness and dependabiliy of operation that has previously not been obtainable. This electrode is described and claimed in my copending application Ser. No. 546,430, filed of even date herewith, and assigned to the same assignee as the present invention.

In operation, the vehicle 10 is positioned so that it straddles the pipe 13, or other object on the marine floor to be buried, and the trenching mechanism 15 lowered into operative engagement with that portion of the marine floor to be trenched. The electrode 25 or a plurality of electrodes, as shown in FIG. 2, are rapidly discharged so that the shock wave generated by them is directed against the marine floor causing it to become fluidized and incapable of supporting weight. As the trenching apparatus 15 is lowered further it moves into the fluidized portion until it finally assumes the generally vertical condition position shown in FIG. 1. Once this position has been reached, continuous repeated discharges of the electrodes are effected as the carrier vehicle 10 moves along the path in which the pipe has been laid. Thus, while discharging the electrode and maintaining it operatively adjacent the marine floor, fluidization of progressvely new portions is effected and the pipe is continuously buried in the marine floor.

One of the important features of this invention resides in the fact that since only a portion of the marine floor becomes fluidized, none of the solid material is physically removed from the site of entrenchment. Hence, once the object to the buried has settled through the fluidized material to the bottom of the trench, it will become completely buried by allowing the solids in the fluidized mass to settle back to their original position. Thus, one of the major problems formerly attending the burial of objects on marine floors is overcome.

FIG. 2 of the drawings shows the manner in which a trench of appreciable size can be created, since by utilizing a device of the type shown it is readily possible to create a trench which ranges from three to four feet in depth and three to five feet in width, for example.

Since in constructing a trench to receive pipe of large diameter it is necessary to construct the trench of some appreciable depth, for example on the order of four feet, it is apparent that material at the bottom of the area under excavation might be somewhat more difficult to dislodge because of the weight of the material above. To overcome this problem, sequential firing of the electrodes 25 is effected. For example, as shown in FIG. 2, the upper 25 is effected. For example, as shown in FIG. 2, the upper bank of electrodes 25 would be fired slightly earlier than the lower bank of electrodes 25 so that substantial overburden would be removed prior to the time that the lower bank is operated.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claim.

What I claim as new and desire to secure by Letters Patent of the United States is:

1. An apparatus for constructing trenches in marine floors such as ocean bottom and the like comprising a support means, means for moving said support means along said marine floor, a plurality of electrodes mounted upon said support means, each said electrode having inner and outer electrode portions defining a discharge gap, means for moving said electrodes from a position wherein said discharge gaps are substantially facing said marine floor to a position wherein said discharge gaps are facing the direction of movement of said support means, at least two of said electrodes being vertically spaced apart when in the latter position, and electrical means for causing repetitive discharges between said electrode portions which generate mechanical shock waves in the water which impinge upon the marine floor at a point adjacent to said electrodes, the upper electrodes being discharged before the lower ones in each series of discharges.

References Cited
UNITED STATES PATENTS

| 1,898,926 | 2/1933 | Aarts et al. | 175—16 |
| 2,975,846 | 3/1961 | Bodine. | |
| 3,122,212 | 2/1964 | Karlovitz | 175—16 X |
| 3,256,695 | 6/1966 | Bodine | 61—72.5 |
| 2,308,860 | 1/1943 | Clark | 175—16 |

OTHER REFERENCES

The Oil and Gas Journal; page 120; vol. 57, No. 38; Sept. 14, 1959.

EARL J. WITMER, *Primary Examiner.*